United States Patent [19]

Haaf et al.

[11] 4,313,864

[45] Feb. 2, 1982

[54] POLYPHENYLENE OXIDE/PLASTICIZER/HYDROGENATED RADIAL TELEBLOCK COPOLYMER BLENDS

[75] Inventors: William R. Haaf, Voorheesville; Gim F. Lee, Jr., Albany, both of N.Y.

[73] Assignee: General Electric Company, Pittsfield, Mass.

[21] Appl. No.: 113,459

[22] Filed: Jan. 21, 1980

[51] Int. Cl.³ .................... C08L 53/02; C08L 71/04; C08K 5/10; C08K 5/52

[52] U.S. Cl. .................... 260/30.6 R; 260/31.8 M; 260/33.6 AQ; 525/90; 525/92; 525/93; 525/901

[58] Field of Search ............... 525/93, 92, 901, 90; 260/30.6 R, 31.8 M, 33.6 AQ

[56] References Cited

U.S. PATENT DOCUMENTS

| | | | |
|---|---|---|---|
| 4,139,574 | 2/1979 | Cooper et al. | 525/92 |
| 4,154,712 | 5/1979 | Lee | 260/29.1 R |
| 4,167,507 | 9/1979 | Haaf | 525/92 |
| 4,242,263 | 12/1980 | Lee | 260/30.6 R |

FOREIGN PATENT DOCUMENTS

| | | |
|---|---|---|
| 1522458 | 8/1978 | United Kingdom . |
| 1559052 | 1/1980 | United Kingdom . |
| 1559263 | 1/1980 | United Kingdom . |

*Primary Examiner*—Herbert J. Lilling
*Attorney, Agent, or Firm*—Hedman, Casella, Gibson and Costigan

[57] ABSTRACT

Thermoplastic moldingcompositions having improved melt-flow characteristics and enhanced impact resistance characteristics are disclosed which comprise in intimate admixture (a) a polyphenylene ether resin, (b) a plasticizer composition, and (c) a minor amount of a hydrogenated radial teleblock copolymer of a vinyl aromatic monomer and a saturated rubber.

13 Claims, No Drawings

POLYPHENYLENE OXIDE/PLASTICIZER/HYDROGENATED RADIAL TELEBLOCK COPOLYMER BLENDS

This invention relates to novel thermoplastic molding compositions which have improved melt-flow characteristics and are moldable into finished articles having greatly enhanced impact resistance. More particularly, this invention is concerned with thermoplastic compositions of a polyphenylene ether resin in admixture with a plasticizer composition and a minor amount of a hydrogenated radial teleblock copolymer of a vinyl aromatic monomer and a saturated rubber.

BACKGROUND OF THE INVENTION

Polyphenylene ether resins are well known in the art as a class of thermoplastics which possess a number of outstanding physical properties. They can be prepared by oxidative and non-oxidative methods, such as are disclosed, for example, in Hay, U.S. Pat. Nos. 3,306,874 and 3,306,875, and Stamatoff, U.S. Pat. Nos. 3,257,357 and 3,257,358.

It has been found that many of the properties of polyphenylene ether resins, e.g., ease of processing, impact strength and solvent resistance, can be improved by combining these resins with other resins, such as, for example, polystyrene or copolymers of polystyrene. Examples of polyphenylene ether resin-polystyrene compositions are disclosed in Cizek, U.S. Pat. No. 3,383,434.

More recently, it has been found that polyphenylene ether resins can also be combined with block copolymers of the A-B-A$^1$ type, e.g., polystyrene-polybutadiene-polystyrene, and with acrylic resin modified diene rubber containing resins, to provide compatible compositions characterized by a number of excellent physical properties in the resulting molded articles.

These discoveries are described in Abolins et al., U.S. Pat. Nos. 3,833,688 and 3,792,123 and in Haaf U.S. Pat. No. 4,167,507, which is assigned to the same assignee as the present application.

It is known in the art that the polyphenylene ethers have excellent flame retardant properties and are classified self-extinguishing and non-dripping according to ASTM Test Method D635 and Underwriters Laboratories Bulletin No. 94. On the other hand, when polyphenylene ethers are combined with other polymers such as the above-mentioned A-B-A$^1$ block copolymers, many of the resulting compositions have poor flame retardancy and are not self-extinguishing, but rather burn slowly upon ignition. Consequently, many compositions composed of polyphenylene ether resin and A-B-A$^1$ block copolymer resins are unable to meet the minimum requirements established by various testing laboratories such as the Underwriters Laboratories. This restricts the use of such compositions for many commercial applications.

Flame retardant additives for thermoplatics are known. In general, these are either blended physically with the thermoplastic or are used to unite chemically with the plastic and to modify it. For instance, self-extinguishing blends of a polyphenylene ether resin and a styrene resin using a combination of an aromatic phosphate and an aromatic halogen for flame retardancy are disclosed by Haaf in U.S. Pat. No. 3,639,506. Other self-extinguishing polyphenylene ether-polystyrene compositions are disclosed by Reinhard in U.S. Pat. No. 3,809,729, wherein aromatic halogens combined with antimony compounds are used as flame retardant additives. Still other flame retardant compositions of a polyphenylene ether resin and a styrene resin which include various phosphorus-containing and halogen-containing flame retardant agents, are described by Haaf et al. in U.S. Ser. No. 647,981, filed Dec. 27, 1975, and assigned to the same assignee as the present application.

However, as is also well known, the inclusion of flame retarding compounds in thermoplastic materials not only affects burning characteristics, it frequently changes other physical properties as well, such as color, flexibility, tensile strength, electrical properties, softening point, and moldability characteristics. Thus, for example, aromatic phosphates such a triphenyl phosphate have been added to blends of polyphenylene ethers and styrene ethers, with flame retardant properties being improved to the point where the compositions can be classified as self-extinguishing and non-dripping according to the above-noted ASTM Test Method D635 and U.L. Bulletin No. 94.

It has also been found that molded compositions consisting of polyphenylene ether or various combinations of polyphenylene ether and certain polymeric modifiers, and aromatic phosphate compounds exhibit excellent self-extinguishing behavior, impact strength and acceptable surface gloss. Such compositions are disclosed by Haaf et al. in co-pending application Ser. No. 870,894, filed Jan. 20, 1978, and assigned to the same assignee as the present invention.

As can be seen by the foregoing, various compositions employing polyphenylene ether resin in admixture with a variety of plasticizer compositions and impact modifiers have been disclosed. It has, nonetheless, now been surprisingly discovered that thermoplastic molding compositions having a combination of improved melt-flow characteristics and, after molding, exceptional impact resistance, may be obtained by the utilization of a polyphenylene ether resin in admixture with a plasticizer composition and a minor amount of a particular class of radical teleblock copolymers, those being the hydrogenated radial teleblock copolymers of a vinyl aromatic copolymer and a saturated rubber, as will become apparent from the following description of the invention.

DESCRIPTION OF THE INVENTION

According to the present invention, there are provided thermoplastic molding compositions having improved melt-flow characteristics and enhanced impact resistance characteristics, comprising an intimate admixture of (a) a polyphenylene ether resin; (b) a plasticizer composition; and (c) a minor amount of a hydrogenated radial teleblock copolymer of a vinyl aromatic copolymer and a saturated rubber.

The polyphenylene ether resins of (a) are preferably of the type having the structural formula:

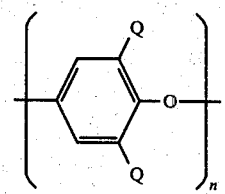

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms and the phenyl nucleus.

An especially preferred class of polyphenylene ether resins for the compositions of this invention includes those of the above formula wherein each Q is alkyl, most preferably having from 1 to 4 carbon atoms. Illustratively, members of this class include poly(2,6-dimethyl-1,4-phenylene)ether; poly(2,6-diethyl-1,4-phenylene)ether; poly(2-methyl-6-ethyl-1,4-phenylene)ether; poly(2-methyl-6-propyl-1,4-phenylene)ether; poly(2,6-dipropyl-1,4-phenylene)ether; poly(2-ethyl-6-propyl-1,4-phenylene)ether; and the like. Most preferred is poly(2,6-dimethyl-1,4-phenylene) ether, preferably having an intrinsic viscosity of about 0.45 deciliters per gram (dl./g.) as measured in chloroform at 30° C.

Included amongst the plasticizer compositions of (b) which may be advantageously employed in the present invention are aromatic phosphate compositions of the formula:

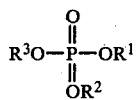

where $R^1$, $R^2$ and $R^3$ can be the same or different and are alkyl, cycloalkyl, aryl, alkyl substituted aryl, halogen substituted aryl, aryl substituted alkyl, halogen, hydrogen and combinations of any of the foregoing, provided that at least one of $R^1$, $R^2$ and $R^3$ is aryl.

Typical examples of suitable aromatic phosphate plasticizers include phenylbisdodecyl phosphate, phenylbisneopentyl phosphate, phenylethylene hydrogen phosphate, phenyl-bis (3,5,5'-trimethylhextyl phosphate), ethyldiphenyl phosphate, 2-ethyl-hexyldi(p-tolyl) phosphate, di-phenyl hydrogen phosphate, bis (2-ethylhexyl) p-tolylphosphate, tritolyl phosphate, bis (2-ethylhexyl)phenyl phosphate, tri-(nonylphenyl) phosphate, phenylmethyl hydrogen phosphate, di(-dodecyl)p-tolyl phosphate, tricresyl phosphate, triphenyl phosphate, dibutylphenyl phosphate, 2-chloroethyldiphenyl phosphate, p-tolyl bis (2,5,5'-trimethylhexyl) phosphate, 2-ethylhexyldiphenyl phosphate, diphenyl hydrogen phosphate, and the like. The preferred phosphates are those where each R is aryl. Especially preferred is triphenyl phosphate.

In addition, other known commercially available flame retardant and non-flame retardant plasticizers may also be employed. Included amongst which, for example, are: the alkyl adipates and alkyl phthalates and paraffinic oils as well as related plasticizers such as will be apparent to those skilled in the art.

The hydrogenated radial teleblock copolymers useful in the present invention are branched polymers having segments, or blocks, which are comprised of a saturated rubber, blocks of a vinyl aromatic polymer, and a coupling agent. The structure of the radial teleblock may be symbolized by $(SR)_nX$, where "SR" is the diblock copolymer of a vinyl aromatic monomer and a saturated rubber, and "n" is the number of diblock chains chemically bonded at the "R" end to the coupling agent, "X". A given $(SR)_nX$ material may contain a number of variously-coupled species wherein $n \geq 2$. $(SR)_nX$'s with average n's of 2-5 are especially preferred.

Radial teleblock copolymers are known in the art. For instance, detailed descriptions of these materials are given by Marrs et al. in Adhesives Age, December, 1971, pp. 15-20 and by Haws et al. in Rubber World, January, 1973, pp. 27-32, the disclosures of which are incorporated herein by reference.

Radial teleblock copolymers are available commercially or can be prepared by following the teachings of the prior art. As an illustration, they can be made by polymerizing conjugated dienes, e.g., butadiene, and vinyl aromatic compounds, e.g., styrene in the presence of an organometallic initiator, e.g., n-butyllithium, to produce copolymers which contain an active metal atom, such as lithium, on one end of each of the polymer chains. These metal atom-terminated polymers are then reacted with a coupling agent which has at least three active sites capable of reacting with the carbon-metal atom bonds on the polymer chains and replacing the metal atoms on the chains. This results in polymers which have relatively long branches which radiate from a nucleus formed by the poly-functional coupling agent. Such a method of preparation is described in detail in Zelinski et al., U.S. Pat. No. 3,281,383, which is incorporated herein by reference.

The coupling agents for radial teleblock copolymers can be chosen from among polyepoxides, polyisocyanates, polyimines, polyaldehydes, polyketones, polyanhydrides, polyesters, polyhalides, and the like. These materials can contain two or more types of functional groups, such as the combination of epoxy and aldehyde groups or isocyanate and halide groups. The coupling agents are described in detail in the above-mentioned U.S. Pat. No. 3,281,383.

The conjugated dienes of radial teleblock copolymers include compounds such as 1,3-butadiene, isoprene, 2,3-dimethyl-1,3-butadiene, 1,3-pentadiene, 3-butyl-1,3-octadiene, and the like.

The vinyl aromatic polymers may be prepared from vinyl aromatic compounds of the formula:

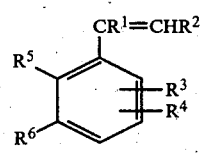

II wherein $R^1$ and $R^2$ are selected from the group consisting of hydrogen and lower alkyl or alkenyl groups of from 1 to 6 carbon atoms; $R^3$ and $R^4$ are selected from the group consisting of chloro, bromo, hydrogen, and lower alkyl groups of from 1 to 6 carbon atoms; and $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group; such as styrene, 1-vinylnaphthalene, 2-vinylnaphthalene, and the alkyl, cycloalkyl, aryl, alkaryl, and aralkyl derivatives thereof. Examples include 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl) styrene, and the like.

Hydrogenation of radial teleblock copolymers to form a hydrogenated radial teleblock copolymer is known in the art and can be carried out by any of several known procedures. See by way of illustration, De Vault, U.S. Pat. No. 3,696,088, the teachings of which are incorporated herein by reference.

In preferred compositions, the hydrogenated radial teleblock copolymer will be a radial teleblock copolymer of styrene and a saturated rubber, with terminal blocks derived from styrene, and a coupling agent selected from epoxidized polybutadiene, $SiCl_4$, polyisocyanates, polyaldehydes, polyhalogen substituted hydrocarbons such as 1,3,5-tri(bromoethyl)benzene or 2,5,6,9-tetrachloro-3,7-decadiene, or mixtures thereof. Especially preferred epoxidized polybutadiene coupling agents are available commercially under the tradenames Oxiron 2000 and Oxiron 2001 from Food Machinery Corporation. Coupling agents are discussed in U.S. Pat. No. 3,281,383, the teachings of which are incorporated herein by reference.

The molecular weight of the hydrogenated radial teleblock copolymer and the ratios of the co-monomers thereof can vary broadly. In preferred embodiments the number-average molecular weight of the hydrogenated radial teleblock copolymer will be from about 50,000 to about 350,000, and will comprise and from 1 to 45 parts by weight of the vinyl aromatic compound and from 99 to 55 parts by weight of the saturated rubber, based on the weight of the radial teleblock copolymer. The amount of coupling agent in the copolymer will depend on the particular agent and the amount of organo-metallic initiator used. Generally, relatively small amounts of coupling agent, e.g., from 0.02 to 1 part by weight per 100 parts by resin are employed.

Preferred hydrogenated radial teleblock copolymers include Solprene® 502 and 512X (containing about 70 parts by weight of hydrogenated butadiene units and about 30 parts by weight of styrene units), which are available commercially from Phillips Petroleum Co., Stowe, Ohio. These materials also include a relatively minor amount of a coupling agent, e.g., less than 1 part by weight of coupling agent per 100 parts by weight of copolymer.

The respective amounts of the major components in the present compositions can vary broadly, e.g., from 60 to 99 parts by weight of polyphenylene ether resin. The most preferred compositions contain no less than about 65% by weight of polyphenylene ether, based on the total weight of the composition. With respect to the plasticizer component, amounts of from 1 to 40 parts by weight of the total composition may be advantageously employed. With respect to the hydrogenated radial teleblock copolymer component amounts from about 1 to about 25 parts by weight of the total composition may be employed with amounts from 5 to 15 parts by weight of the total composition preferred. Particular amounts will, of course, vary depending on the needs of the specific composition.

The compositions of the invention can also further include glass fibers as a reinforcing filler, especially preferably, fibrous glass filaments comprised of lime-aluminum borosilicate glass which is relatively soda free, known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastics reinforcement are made by mechanical pulling. The filament diameters range from about 0.000112 to 0.00075 inch, but this is not critical to the present invention.

In general, best properties will be obtained if the sized filamentous glass reinforcement comprise from about 1 to about 80% by weight based on the combined weight of glass and polymers and preferably, from about 10 to about 50% by weight. Especially preferably, the glass will comprise from about 10 to about 40% by-weight based on the combined weight of glass and resin. Generally, for direct molding use, up to about 50% of glass can be present without causing flow problems. However, it is useful also to prepare the compositions containing substantially greater quantities, e.g., up to 70 to 80% by weight of glass. These concentrates can then be custom blended with blends of resins that are not glass reinforced to provide any desired glass content of a lower value.

Other ingredients, such as stabilizers, pigments, plasticizers, antioxidants, flame retardants and the like, can be added for their conventionally employed purposes.

The compositions of this invention can be prepared conventionally by tumbling the components to form a preblend, extruding the blend into a continuous strand, cutting the strand into pellets or granules, and molding the pellets or granules into the desired shape. These techniques are well known to those skilled in the art and further elaboration herein is not necessary.

DESCRIPTION OF THE PREFERRED EMBODIMENTS

The following examples illustrate compositions according to the invention. They are set forth for illustrative purposes only, and are not to be construed as limiting.

EXAMPLES I-II

The compositions shown in Table 1 were prepared by preblending the components, extruding the blends in a 28 mm Werner-Pfleiderer twin screw extruder under the following conditions: 500° F., zero vent vacuum, 260 screw rpm, and 500 lbs.-in. torque Test pieces were injection-molded using a 3 oz. Newbury machine set at a cylinder temperature of 520° F. and a mold temperature of 200° F. All composition amounts are in parts by weight. The various measurements reported for the following parameters are in the units indicated.

HDT = Heat deflection temperature (°F.) under 264 psi fiber-stress (⅛"×½"×2½" specimens).

FC = Flow channel length (in.) using the above molding temperatures at 10,000 psi.

Avg. UL94 = The average of the self-extinguishing times (sec.) (five 1/16"×½"×5" specimens) using Underwriters' Laboratories Bulletin 94 flame-test procedures.

Izod = Notched Izod impact resistance (ft.-lbs./in.-n) (⅛"×½"×2½" specimens).

Gard = Gardner drop-dart impact resistance, 50% failure value (in.-lbs.) (⅛"×2½"×3¾" chips).

Tensile = Percent elongation, yield strength (psi), and strength at break (psi) (⅛"×2½" L-type bars).

TABLE I
EXAMPLES I–II

| | Composition | | | | | Avg. | | | | Tensile | |
|---|---|---|---|---|---|---|---|---|---|---|---|
| | PPO[1] Resin | Plasticizer[2] | Hydrogenated Teleblock Copolymer | HDT | FC | 1/16" UL94 | Izod | Gard | %E | Yield | Break |
| Example I (Control) | 80 | 20 | — | 208 | 18 ½ | 1.6 | 1.1 | 21 | 94 | 10,200 | 10,000 |
| Example II | 80 | 20 | 10[3] | 214 | 22 ½ | 1.5 | 7.5 | 275 | 92 | 7,800 | 8,300 |

Composition:
[1] Polyphenylene oxide of about 0.48 dl/g intrinsic viscosity in chloroform at 30° C.
[2] Triphenylphosphate.
[3] Phillips' Solprene® 512X grade of radial teleblock copolymer of styrene and butadiene, wherein the butadiene is saturated via post-hydrogenation. The weight-ratio of S/sat'd B is about 30/70.

EXAMPLES III–XIV

The compositions shown in Table 2 were prepared in accordance with the comments set forth in the notes appended to the Table and illustrate the improved melt-flow capability for a number of different PPO/plasticizer compositions when a radial teleblock copolymer is present.

In addition, this data illustrate that blends containing a fire retardant additive continue to exhibit excellent fire retardant behavior after the addition of the radial teleblock copolymer and in fact even blends containing a non-flame retardant additive exhibit a surprising improvement in the degree of fire retardance when the radial teleblock copolymer is employed.

In addition, the data in Table 2 illustrate a substantial increase in the Izod and Gardner impact measurements when a radial teleblock copolymer additive is employed.

Although the above examples illustrate various modifications of the present invention, other variations will suggest themselves to those skilled in the art in the light of the above disclosure. It is to be understood, therefore, that changes may be made in the particular embodiments described above which are within the full intended scope of the inventions as defined in the appended claims.

We claim:

1. A thermoplastic molding composition having improved melt-flow characteristics and enhanced impact resistance characteristics, consisting essentially of an intimate admixture (a) a polyphenylene ether resin present in an amount to provide no less than about 65% by weight of the total weight of the composition;
    (b) a plasticizer composition selected from aromatic phosphates, alkyl adipates, alkyl phthalates or paraffinic oils; and
    (c) a minor amount of a hydrogenated radial teleblock copolymer of a vinyl aromatic monomer and a saturated rubber.

2. A thermoplastic molding composition as defined in claim 1 wherein the polyphenylene ether resin (a) is of the formula:

TABLE 2
EXAMPLES III–XIV

| Examples[1,2] | Composition (pbw) | | | HDT[9] | FC[10] | Averaged UL94[11] | | Izod[13] | Gardner[14] |
|---|---|---|---|---|---|---|---|---|---|
| | PPO[3] | Plasticizer | HTCP[4] | | | ⅛" | 1/16" | | |
| III | 70 | 30 K50[5] | — | 146 | 32 ½ | 0.1 | drips[12] | 0.5 | <10 |
| IV | 70 | 30 K50 | 10 | 147 | 36 ½ | 0.5 | 0.9 | 1.5 | 170 |
| V | 80 | 20 K50 | — | 213 | 16 ½ | 0.2 | 0.3 | 0.9 | 10 |
| VI | 80 | 20 K50 | 10 | 220 | 19 ½ | 0.1 | 0.8 | 3.3 | 230 |
| VII | 90 | 10 K50 | — | 292 | 12 | 0.5 | 1.6 | 1.0 | 15 |
| VIII | 90 | 10 K50 | 10 | 288 | 15 | 0.6 | 1.8 | 6.4 | 230 |
| IX | 80 | 20 Min. Oil[6] | — | 209 | 17 ¼ | 14.5 | 5.7 | 1.1 | <10 |
| X | 80 | 20 Min. Oil | 10 | 213 | 28 ¾ | 18.2 | drips[12] | 12.7 | 160 |
| XI | 80 | 20 DOP[7] | — | 201 | 18 ½ | 9.7 | drips[12] | 0.8 | 30 |
| XII | 80 | 20 DOP | 10 | 202 | 25 | 21.6 | drips[12] | 10.3 | 190 |
| XIII | 80 | 20 DOA[8] | — | 178 | 22 ½ | 14.6 | drips[12] | 1.3 | 275 |
| XIV | 80 | 20 DOA | 10 | 183 | 31 | 23.4 | drips[12] | 13.3 | 170 |

[1] Blends were extruded on a Werner-Pfleiderer 28 mm twin-screw extruder at 490–520° melt and zero vent-vacuum. Examples VII and VIII were extruded at 550–560° F. melt.
[2] Blends were molded on a 4 oz. Newbury machine at 540° F. melt/190° F. actual mold surface. Examples VII and VIII were molded at 560° F. melt/200° F. actual mold.
[3] Polyphenylene oxide of 0.49 dl/g intrinsic viscosity in chloroform at 30° C.
[4] Hydrogenated Teleblock Copolymer used was Phillips Petroleum's Solprene® 512X, a radial teleblock copolymer of styrene and butadiene, wherein the butadiene is saturated via post-hydrogenation. The weight-ratio of S/sat'd BD is about 30/70.
[5] FMC Corp.'s Kronitex® 50 grade of isopropylated triphenyl phosphate, a fire-retardant additive for Examples III–VIII.
[6] Witco Chemical's Kaydol® extra-heavy mineral oil.
[7] Dioctyl phthalate.
[8] Dioctyl adipate.
[9] Heat deflection temperature (°F.) under 264 psi fiber-stress (⅛" × ½" × 2 ½" specimens).
[10] Flow channel length (in.) using the molding temperatures in ([2]) at 10,000 psi injection pressure.
[11] The average of the self-extinguishing times (sec.) using either ⅛" × ½ × 2 ½ specimens or 1/6" × ½" × 5" specimens in conjunction with Underwriters' Laboratories Bulletin 94 flammability-test procedures.
[12] "Drips" refers to the physical separation of a portion of the burning specimen from the main body of the specimen. It is a kind of low shear-rate melt flow induced by the heat generated during the burning test, and is generally regarded as being undesirable inasmuch as it suggests that the burning material will tend to involve other nearby combustibles.
[13] Notched Izod impact resistance (ft.-lbs./in.-n.) using ⅛" × ½" × 2 ½" specimens.
[14] Gardner falling-dart impact resistance (in.-lbs.). Values reported are 50% failure values obtained using the Bruceton Staircase method (⅛" × 2 ½" × 3 ¾").

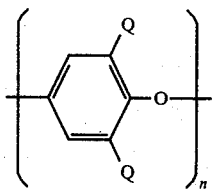

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

3. A thermoplastic molding composition as defined in claim 2 wherein in said polyphenylene ether resin (a), each Q is alkyl having from 1 to 4 carbon atoms.

4. A thermoplastic molding composition as defined in claim 3 wherein in said polyphenylene ether resin (a), each Q is methyl.

5. A thermoplastic molding composition as defined in claim 1 wherein the hydrogenated radial teleblock copolymer is of the formula $(SR)_nX$, where SR is the diblock copolymer of a vinyl aromatic monomer and a saturated rubber, and n is the number of diblock chains chemically bonded at the R end to a coupling agent X.

6. A thermoplastic molding composition as defined in claim 5 wherein the hydrogenated radial teleblock copolymer is of the formula $(SR)_nX$ wherein n is from 2 to 5.

7. A thermoplastic molding composition as defined in claim 1 wherein the hydrogenated radial teleblock copolymer comprises from 1 to 45 parts by weight of a vinyl aromatic compound and from 99 to 55 parts by weight of a saturated rubber, and a relatively small amount of a coupling agent, based on the total weight of the hydrogenated radial teleblock copolymer.

8. A thermoplastic molding composition as defined in claim 7 wherein, in the hydrogenated radial teleblock copolymer, the coupling agent is a polymer selected from the group consisting of polyepoxides, polyisocyanates, polyimines, polyaldehydes, polyketones, polyanhydrides, polyesters, and polyhalides.

9. A thermoplastic molding composition as defined in claim 7 wherein, in the hydrogenated radial teleblock copolymer, the vinyl aromatic compound is styrene, the saturated rubber is butadiene, and the coupling agent is selected from the group consisting of epoxidized polybutadiene, $SiCl_4$, and mixtures thereof.

10. A thermoplastic molding composition as defined in claim 1 wherein the plasticizer is an aromatic phosphate of the formula:

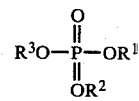

wherein $R^1$, $R^2$ and $R^3$ are the same or different, and are alkyl, cycloalkyl, aryl, alkyl substituted aryl, halogen substituted aryl, aryl substituted alkyl, halogen, hydrogen and combinations of any of the foregoing, provided that at least one of $R^1$, $R^2$ and $R^3$ is aryl.

11. A thermoplastic molding composition as defined in claim 10 wherein the aromatic phosphate is triphenyl phosphate.

12. A thermoplastic molding composition as defined in claim 11 wherein the triphenyl phosphate is an alkylated triphenyl phosphate.

13. A thermoplastic molding composition according to claim 1 consisting essentially of in intimate admixture
(a) about 70–90 parts by weight of a polyphenylene ether resin;
(b) about 10–30 parts by weight of a plasticizer composition; and
(c) about 10 parts by weight of a hydrogenated radial teleblock copolymer of a vinyl aromatic monomer and a saturated rubber.

* * * * *